Nov. 10, 1931. J. M. McGINLEY Re. 18,249
DETACHABLE SUPPORT
Original Filed Sept. 30, 1924
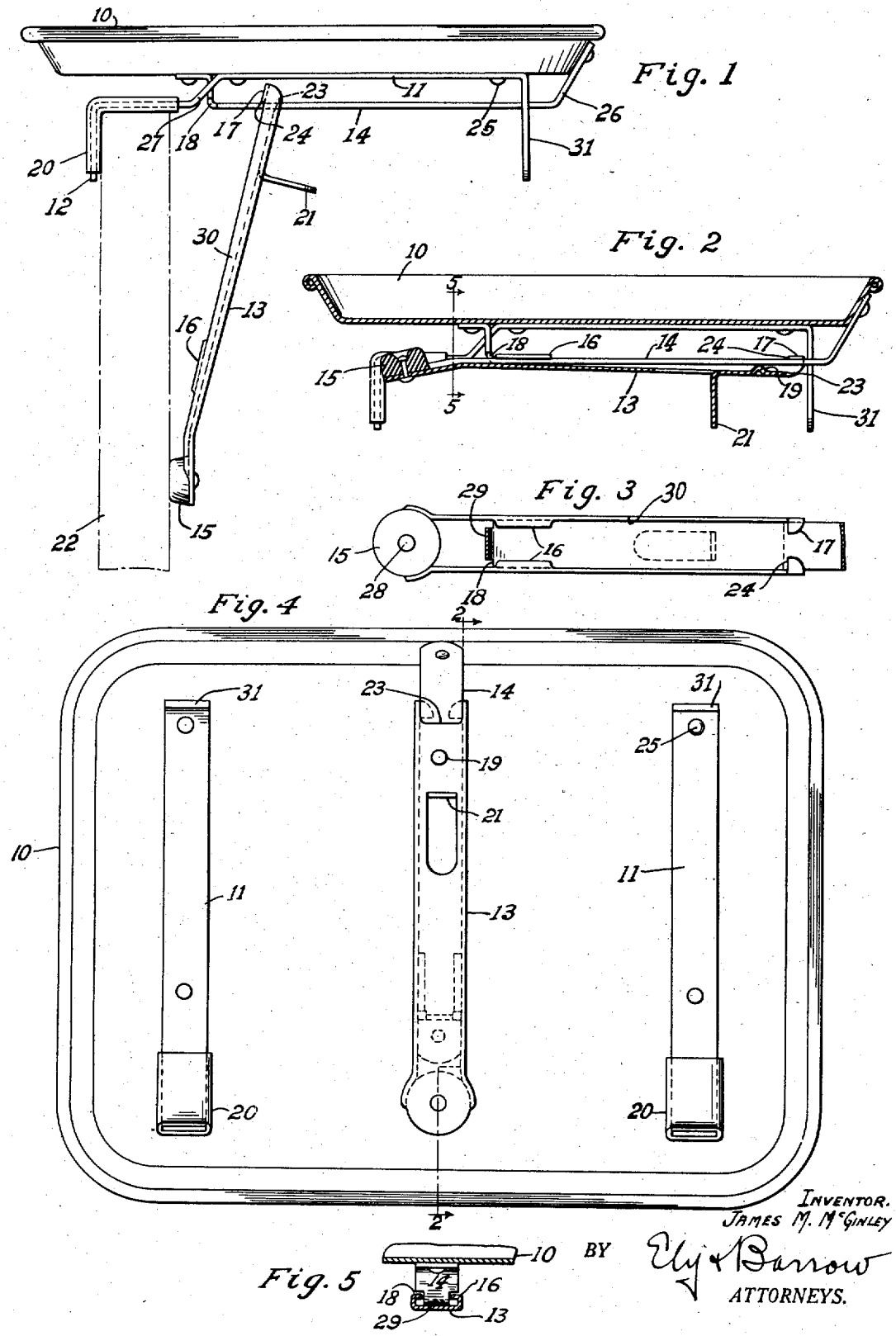
INVENTOR.
JAMES M. McGINLEY
BY Ely & Barrow
ATTORNEYS.

Reissued Nov. 10, 1931 Re. 18,249

UNITED STATES PATENT OFFICE

JAMES M. McGINLEY, OF FORT WORTH, TEXAS, ASSIGNOR, BY DIRECT AND MESNE ASSIGNMENTS, OF TWENTY-SEVEN AND ONE-HALF PER CENT TO W. L. McGINLEY, OF SAN ANTONIO, TEXAS, AND SEVENTY-TWO AND ONE-HALF PER CENT TO TRAY SERVICE COMPANY, OF DALLAS, TEXAS, A CORPORATION OF TEXAS

DETACHABLE SUPPORT

Original application filed September 30, 1924, Serial No. 740,760. Renewed October 23, 1929. Original No. 1,760,912, dated June 3, 1930. Application for reissue filed March 18, 1931. Serial No. 523,610.

My invention relates to detachable supports, and more especially to detachable supporting devices which may serve to receive various articles on its upper surface, and be attached readily to a substantially vertical plate at its upper edge, whether the plate-like member be flat or slightly curved, and at the same time may be collapsed or folded into small space for storage when it is not needed.

It is an object of my improved support that it may be supported solely upon a vertical frame or plate, there being no supporting legs to rest on adjacent surfaces which are likely to have an uneven character and thus result in an uncertain face for the articles desired to be placed thereon, and which are likely to unnecessarily obstruct the vicinity of the device. My device on the contrary rests all its weight and that of the articles placed thereon, upon the vertical wall or plate to which it is attached.

A further object of my improved device is to provide a horizontal plate or shelf-like support with parts connected therewith for resting upon the upper edge of a vertical plate or wall and also a brace connected underneath said supporting plate and bearing laterally against the side face of said wall to more positively hold the plate in proper horizontal position while the device is attached. The said brace is adjustable to fit vertical walls or plates of different thickness, or for walls which may be slightly curved, as the doors of some automobiles. This brace member is also collapsible for folding into position parallel with a part of said device when it is desired to store the unitary device in a minimum amount of space.

It is a further object of my improvement that when in its collapsed arrangement, the entire article serves well as a shallow receptacle or tray having short supporting legs for positioning the same on a flat surface, as upon a table, chair or a horizontal surface of the ground or the floor of a vehicle.

Further, it is a great advantage of my improved device that either in its collapsed or open positions, the parts are held in bound engagement with adjacent parts so that there can result no rattling or loose and uncertain movement of the device. These are all of great value in using the article, and especially inasmuch as no screws or other separate fasteners are required for assembling or detaching the same, the rearrangement of the device in supporting position or for storing merely requiring certain relative movements of parts to attain the desired result. No means are required to hold the parts in connected arrangement either, as none of the parts are detachable from the others, though the entire device is detachable from the stationary wall supporting it. Also, it is clear that when collapsed, the unitary device may be readily supported upon a flat surface, when the non-rattling feature will be especially appreciated.

With these and other objects of my invention contemplated in this disclosure, I have set forth the same in the appended claims, described it in detail in the specification hereunto attached and illustrated it in the accompanying drawings in which—

Figure 1 is a side elevation of the device shown attached to a vertical plate or wall;

Figure 2 is a longitudinal, vertical section taken on the line 2—2 of Fig. 4;

Figure 3 is a detail view of the brace element in collapsed position;

Figure 4 is an inverted plan of the device, and

Figure 5 is a detail section taken on line 5—5 of Fig. 2.

Referring to the drawings, numeral 10 designates broadly a suitable flat receptacle, such as a tray or other similar flattened article here shown as provided with a border flange, though this is immaterial so far as the supporting mechanism is concerned. Two metallic strips 11 are attached to the bottom of 10 by rivets 25, each strip being adjacent the end of the bottom and preferably in parallelism with each other. Between these is a bar 14 having an end bent for attachment to the bottom and the other end bent obliquely at 26 and projecting out beyond the receptacle to bear against the flange thereof to which it is riveted. The intermediate part of the bar 14 is appreciably spaced from the bottom for a reason explained later. At the joint where the bar is bent down for connection to the bottom of the receptacle, notches 18 are cut out at either side providing a narrowed portion 29 whose purpose will appear as the description proceeds. Otherwise 14 is a flat bar of sheet metal attached firmly to the receptacle at two points, as above stated.

As for purposes of description we shall refer to the end of the dish 10 having the bar end 26, as the forward end of the same, the rear ends of the plates 11 are bent obliquely away from 10 at 27 and then in parallelism with the bottom plate and then down at right angles to 10, as shown in the drawings at 12. This results in two angle ends which may serve as hook parts to rest upon the edge of a vertical support shown in the drawings as a plate or wall 22. The ends 12 are covered with a rubber composition 20 to avoid the rattling of parts when attaching the ends on the support, and serving also to cling more or less to such support, an advantage in use.

These angle ends 12 serve to support the rear end of the receptacle 10 on the wall 22, but the front portion must be supported on the same member 22 which may be a flat, vertical plate such as the back of a chair, or may be the door of an automobile, as will be explained in the operation of the device. For the latter purpose, a brace member 13 is provided which may be positioned in parallel relation with the bottom 10 for storage, or opened out for bracing function, as shown in Fig. 1. The stored position is shown in Figs. 2, 3 and 4.

This brace member 13 comprises a main flat sheet metal bar having one end curved and bearing thereon a pad or cushion member 15 for easily contacting the wall 22, the pad being secured to the bar by suitable rivet as 28. This end of the brace is slightly bent from the axis of the main bar so that the end will be substantially parallel with the wall 22, though the bar is appreciably inclined, as shown in Fig. 1. Throughout the length of the brace member, side flanges 30 are bent in parallelism to afford greater bracing strength and to enable them to serve as enclosing wings for the bar 14 upon which the brace is mounted in permanent relation in whatever position it may assume for bracing or in storage. These flanges 30 have spaced lips 16 and 17 integral therewith, the lips 16 completing the enclosure of the bar 14 when the brace is collapsed and the lips 17 separated a smaller distance than that between 16, as shown in Fig. 3. The latter will permit the narrow portion 29 to slide between them, but the space between the lips 17 is too narrow to permit such separation, so that the brace 13 must remain connected to the bar 14 in all relations.

A further and very important feature of my improved construction consists in the fact that the main flat portion of the brace 13 extends beyond the flanges 30, while at the other end of the brace said portion ends quite a little short of the lips 17. This structure provides for a lever action between the edge 23 of the main portion of the brace, and the inner edges 24 of the lips 17. These points 23 and 24 grip the bar 14 when the lips 16 have been detached from the bar and the brace has been swung down to the actuating position shown in Fig. 1. It is evident that this arrangement permits an adjustment of the brace along the bar 14 when the clamping action of said points is released as by manual operation thereof by grasping the toe 21 which has been cut out of the brace plate for the purpose. It is also evident that when the weight of the receptacle rests in part on said brace 13, the strain or stress of the parts 23 and 24 on the bar will grip the latter sufficient to avoid slipping of the parts during bracing action. Such adjustment permits use of the same device on vertical plates of different thickness and on plates of slightly different inclination or of curved surfaces, as in the doors of automobiles.

Back of the edge 23 the main portion of the brace has a protuberance 19 punched inward, as shown very clearly in Fig. 2. This serves by positive contact with the bar 14 to hold the brace member against movement that would result in a rattling noise when the parts are collapsed. As seen in Figs. 2 and 3, the protuberance 19, with the forward and rear edges of the lips 16, form three contact points of engagement between 13 and 14 which tighten the latter together by slight bending action of 14 and thus quite positively prevent rattling when in the relative position shown in these views.

The forward ends of the bars 11 are bent straight downward to form suitable short legs 31 for supporting the tray or other receptacle when the latter is to rest on a level surface, as on a table or chair seat. In such case, the four legs 12 and 31 serve a very useful purpose in holding the receptacle 10 spaced above a horizontal foundation, since if heated dishes or foods are to be carried in the tray, the legs will not conduct heat to the surface below.

In the above description, the terms downward and upward, and vertical and horizontal are used for convenience of description only, and are not intended to be construed as positive limitations of the structure disclosed. They serve their purpose though in describing the relative positions of the receptacle and the permanent support therefor.

In use, the bar 13 is swung on the eye adjacent one of its ends formed between the edge 23 of the main plate and the rear edges 24 of the lips 17, toward the receptacle while the bar is extended far to the rear until the parts 13 and 14 are nearly in parallelism, when the part 13 is forced forwardly with the lips 16 in engagement above the bar 14, as far as it will go. In this final collapsed position, as shown in Figs. 2 and 4, in particular, the protuberance 19 is pressed against the under side of the bar 14 by which the slight elasticity of the metal will provide a tight binding action preventing rattling or accidental displacement of the parts under ordinary conditions. In this collapsed position of the device, the legs 12 and 31 will serve well as means for holding the receptacle spaced from a horizontal surface, as well as certain of them being useful for manual engagement in carrving the device. When it is to be used to support various articles upon the upper edge of a vertical plate or wall not too great in thickness, as the door of an automobile, the back of a chair, or any vertical edge, the rear end of the bar 13 is disengaged from the bar 14 by sliding it rearwardly of the latter until the parts 16 are clear of the bar, the narrow point 29 permitting this movement readily, and the padded end is swung out to the inclined position shown in Fig. 1. The eye between 23 and 24 will permit adjustment of the bar 13 along the bar 14 until the proper point is reached, when the receptacle will be supported upon the upper edge of the plate 22 by the legs or hooks 12 and braced by the pad 15 of the bar 13 contacting the plate at a lower point. The thicker the plate 22, the farther forward will the bar 13 be adjusted, as will be evident.

My improved support is therefore adjustable for detachably engaging a vertical foundation, and may be collapsed to a size requiring hardly no more room for storing than the receptacle alone would without the brace member. It provides a positive engagement with the support when it is needed, but may readily be disengaged therefrom when no longer required. It is noiseless when in use or collapsed and furnishing a convenient flat and level surface for any purpose where a vertical or horizontal foundation is to be had.

Having described my improvement and its manner of operation, what I claim and desire to secure by Letters Patent is:

1. The combination of a receptacle having a substantially flat bottom and means for holding the same detachably above and upon the upper edge of a vertical support comprising, spaced bars rigidly secured to the bottom surface of the receptacle and having downwardly-bent ends which are of equal length so that they may support the receptacle substantially horizontally when detached from the vertical support, and the bent ends of bars adjacent the same edges of the receptacle serving as hooks to engage the said upper end in overhanging relation, an engaging bar secured to the said bottom surface with a portion spaced therefrom, and rigid brace means having a free portion for engaging the side wall of said support and an eye spaced from said free portion for adjustably engaging the said spaced portion of the engaging bar and movable thereon to vary the inclination of the brace means relative to the vertical support whereby the same receptacle and holding means may be used with vertical supports of different thickness.

2. The combination of a flat receptacle having spaced hooks secured permanently to its under surface for engaging detachably the edge of a vertical support, an engaging bar secured to said receptacle and a brace member comprising, an elongated flanged sheet metal plate, the flanges being bent-up from the sides of the plate and extending beyond the plate at one end and overhanging lips integral with the flanges at the latter end thus forming an eye to receive therein said bar, the lips being spaced apart too little to permit disengagement from the bar, but the edge of the plate and the rear edges of the lips serving as engaging points for the faces of the bar to hold the brace at a proper inclination whereby the contact of the brace with the support will hold the receptacle in position at an angle to the support.

3. The combination of a receptacle having flat bottom and attaching means adjacent one edge thereof for overhanging engagement with the upper edge of a vertical support, an engaging member secured to the under surface of said receptacle and having a portion spaced therefrom, and a rigid brace bar having an eye portion adjacent one of its ends for engaging said spaced portion for adjustment thereon, so that the brace bar may be moved on said spaced portion toward and from said support, and means thereon for engaging said spaced portion in folded relation to close the parts when the receptacle is detached from the support.

4. The combination of a receptacle having elongated and spaced attaching bars secured to the underside thereof and overhanging ends to engage the upper edge of a vertical support, an engaging bar having its ends secured to the receptacle with its intermediate portion spaced therefrom, and a brace member comprising an eye at one end threaded non-detachably to said portion for adjustment thereon, an outer end swinging loosely on said eye and adapted to engage said support to hold the receptacle against swinging downward on said overhanging ends, and inwardly-bent flange portions midway the length of said member for engaging the said portion when the brace member is swung on the eye against the intermediate portion for telescopic engagement therewith.

5. The combination of a receptacle having attaching means adjacent one edge thereof, engaging means on the under side thereof, and a brace member having an eye in one end for adjustably connecting with said engaging means and means at its opposite end for contacting a vertical support upon which the receptacle rests detachably, means intermediate the ends of said brace member for engaging said engaging means to hold the member against the engaging means for packing, and a protuberance on said brace member just within the eye for contacting the engaging means to hold the brace member against movement of the parts, and thereby avoid unnecessary rattling thereof.

6. The combination with a service tray for the purpose of dispensing refreshments or the like, said tray having comparatively short supporting legs so arranged that it may be supported in a substantially horizontal position upon a flat surface and permitting compact stacking of the trays, of means for detachably holding said tray upon a vertical support, said means comprising a brace movably mounted upon the under side of the tray and operable into cooperation with a side of a vertical support upon which the tray is resting, said brace in operative position extending below said legs so as to support said tray upon said vertical support, said brace being collapsible to a position under the tray above the lower ends of said legs, whereby the tray may be supported on a flat surface by said legs and also stacked without interference by said brace member, and means associated with the brace on the under side of the tray and out of obstructing relation to the upper surface of the tray on which the refreshments are placed to hold the brace in said extended position.

7. The combination of a service tray for dispensing refreshments or the like and means for holding the same detachably upon the upper edge of a vertical support, said tray having short legs thereon permitting compact stacking of the trays and extending downwardly therefrom so that they may support the tray substantially horizontally when said tray is detached from the vertical support and placed upon a flat surface, said tray being adapted to be hooked over the upper edge of said vertical support, an adjustable brace, means for attaching said brace to the tray so that the brace in operative position will extend downwardly below the lower ends of said legs in engagement with the side of said vertical support, to support the tray upon said vertical support, said attaching means permitting movement of said brace whereby it may be adjusted into cooperation with vertical supports of different thicknesses, said brace being collapsible to a position under said tray above the lower ends of said legs when said tray is detached from said vertical support so as not to interfere with stacking of the trays or with placing of said tray upon said flat surface with the lower ends of said legs seated on said surface, and means associated with said brace on the under side of the tray for holding the brace from collapsing when said brace is in operative relation with the side of the vertical support.

JAMES M. McGINLEY.